US012111012B2

(12) United States Patent
Kampf et al.

(10) Patent No.: US 12,111,012 B2
(45) Date of Patent: Oct. 8, 2024

(54) COMPOSITE TANK

(71) Applicant: AMTROL LICENSING INC., West Warwick, RI (US)

(72) Inventors: Christopher Kampf, Moosup, CT (US); Jeffrey Neto, Cumberland, RI (US); Ken Cerpovicz, Warwick, RI (US); Jody McKinley, Mt. Vernon, OH (US)

(73) Assignee: AMTROL LICENSING INC., West Warwick, RI (US)

( * ) Notice: Subject to any disclaimer, the term of this patent is extended or adjusted under 35 U.S.C. 154(b) by 0 days.

(21) Appl. No.: 17/591,958

(22) Filed: Feb. 3, 2022

(65) Prior Publication Data
US 2022/0154881 A1 May 19, 2022

Related U.S. Application Data

(63) Continuation of application No. 16/697,462, filed on Nov. 27, 2019, now Pat. No. 11,274,793.

(51) Int. Cl.
*F17C 1/08* (2006.01)
(52) U.S. Cl.
CPC ........ *F17C 1/08* (2013.01); *F17C 2201/0114* (2013.01); *F17C 2203/012* (2013.01); *F17C 2203/0673* (2013.01); *F17C 2205/0107* (2013.01)
(58) Field of Classification Search
CPC .............. F17C 2203/0673; F17C 1/08; F17C 2201/0114; F17C 2203/012; F17C 2205/0107

USPC ....................... 220/4.07, 4.27, 582
See application file for complete search history.

(56) References Cited

U.S. PATENT DOCUMENTS

| 2,346,423 | A | * | 4/1944 | Gray | ....................... G01M 3/04 |
| | | | | | 122/13.01 |
| 2,827,195 | A | | 3/1958 | Kearns | |
| 4,006,838 | A | | 2/1977 | Baumann | |
| D244,578 | S | | 6/1977 | Avant | |
| 4,214,611 | A | | 7/1980 | Takacs et al. | |
| D276,889 | S | | 12/1984 | Biesecker | |
| D284,033 | S | | 5/1986 | Brodsky | |

(Continued)

FOREIGN PATENT DOCUMENTS

| CA | 2518095 | 9/2004 |
| CA | 2584183 | 4/2006 |

(Continued)

OTHER PUBLICATIONS

PCT/US2020/061790; Notification of Transmittal of the Intl. Search Report and the Written Opinion of the Intl. Searching Authority; 14 pgs. mailed Mar. 15, 2021.

(Continued)

*Primary Examiner* — Stephen J Castellano
(74) *Attorney, Agent, or Firm* — TUCKER ELLIS LLP

(57) ABSTRACT

Provided is a tank including a polymeric upper dome having a neck with a through passage, a polymeric lower dome having a neck with a through passage, a polymeric shell having a first end connected to the upper dome and a second end connected to the lower dome, and a connection attached to each of the upper and lower domes in the through passages of the necks, wherein the upper dome, lower dome, and shell form a cavity.

13 Claims, 21 Drawing Sheets

(56) References Cited

U.S. PATENT DOCUMENTS

| | | | |
|---|---|---|---|
| D287,335 S | 12/1986 | Anderson | |
| 4,637,435 A | 1/1987 | Chirdon | |
| D295,886 S | 5/1988 | Dolton | |
| D306,639 S | 3/1990 | Wills | |
| D335,744 S | 5/1993 | Small | |
| 5,388,720 A * | 2/1995 | Murphy | F17C 13/002 138/30 |
| 5,429,845 A * | 7/1995 | Newhouse | F17C 1/16 220/582 |
| 5,494,188 A * | 2/1996 | Sirosh | F17C 1/16 220/901 |
| 5,780,130 A | 7/1998 | Hansen | |
| 5,829,614 A | 11/1998 | Collette | |
| 5,915,738 A * | 6/1999 | Guest | F16L 37/0982 285/308 |
| 6,103,280 A | 8/2000 | Molzahn | |
| D537,977 S | 3/2007 | Chen | |
| D621,471 S | 8/2010 | Bock | |
| D667,130 S | 9/2012 | Baker | |
| D700,948 S | 3/2014 | McGiveron | |
| 8,967,422 B2 * | 3/2015 | Volkmann | B65D 88/005 220/687 |
| D746,942 S | 1/2016 | Koppert | |
| 9,528,659 B2 | 12/2016 | Manser et al. | |
| 9,751,689 B2 | 9/2017 | Dinovo et al. | |
| 10,723,080 B1 * | 7/2020 | Holbrook | B29C 65/56 |
| D912,199 S | 3/2021 | Aguiar | |
| D923,136 S | 6/2021 | Kaplan | |
| 2006/0000839 A1 * | 1/2006 | Gremour | F24D 3/1008 220/721 |
| 2009/0266816 A1 | 10/2009 | Holroyd | |
| 2013/0082074 A1 | 4/2013 | Armstrong | |
| 2018/0080607 A1 | 3/2018 | Van Haaren et al. | |
| 2018/0162081 A1 * | 6/2018 | Kloft | B29C 49/041 |

FOREIGN PATENT DOCUMENTS

| | | |
|---|---|---|
| CN | 303618441 | 3/2016 |
| CN | 303900716 | 10/2016 |

OTHER PUBLICATIONS

Coleman Fuel Cylinder found on Jul. 22, 2021 at: https://www.amazon.com/Propane-Fuel-Cylinders-pk-oz/dp/B016YLUXLE/ (Year: 2017).

\* cited by examiner

COMPOSITE TANK

RELATED APPLICATION DATA

This application is a continuation of U.S. patent application Ser. No. 16/697,462 filed Nov. 27, 2019, which is hereby incorporated herein by reference.

TECHNICAL FIELD

In general, the present invention relates to a tank, and in particular to a composite fluid tank.

BACKGROUND OF THE INVENTION

Many well and expansion tanks use a diaphragm or bladder to separate air from water. An air charge pressure on one side keeps the diaphragm/bladder at a distance away from the inside wall of the tank in the air dome. When the tank is installed onto a water system, the water system pressure pushes back against the diaphragm/bladder, compressing the air. The proper pre-charge will continue to keep the diaphragm/bladder away from the tank wall. If the pre-charge pressure is not enough to provide an air volume appropriate for the water supply pressure, the diaphragm/bladder will fill the air cell. If eventually the diaphragm/bladder "bottoms out" on the tank wall, the tank becomes ineffective in the function it has been design to provide. One type of such tank is a Type IV fiberwound tank. The industry defines this tank as having a plastic liner with fiberwinding around the liner.

SUMMARY OF THE INVENTION

In accordance with an embodiment of the present application, a tank is provided that includes a polymeric upper dome having a neck with a through passage, a polymeric lower dome having a neck with a through passage, a polymeric shell having a first end connected to the upper dome and a second end connected to the lower dome, and a connection attached to each of the upper and lower domes in the through passages of the necks, the connections being the same as one another, wherein the upper dome, lower dome, and shell form a cavity.

In accordance with another embodiment of the present application, a tank assembly is provided that includes a tank including a polymeric body defining a cavity and having an upper neck and a lower neck each defining a through passage in communication with the cavity, and a lower connector having an inlet portion attached to the lower neck and a conduit portion extending from the inlet portion, the inlet portion and conduit portion each having a through passage fluidly connected with one another to direct flow from the cavity through the conduit portion, and a support stand supporting the tank, the support stand including a support body having an upper wall and a locking aperture defined in the upper wall through which the lower connector extends, a sidewall extending downward from the upper wall and having an aperture through which the conduit extends, a lower wall extending downward from a lower end of the sidewall, and an attachment mechanism extending from the locking aperture for connection to the tank.

In accordance with still another embodiment of the present application, a tank is provided that includes a polymeric upper dome, a polymeric lower dome, a polymeric shell having a first end connected to the upper dome and a second end connected to the lower dome and forming with the upper and lower dome a cavity, a flexible diaphragm connected to an inner wall of the polymeric shell in the cavity, and a fiberwinding layer around an outer surface of the polymeric upper dome, polymeric lower dome, and polymeric shell.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
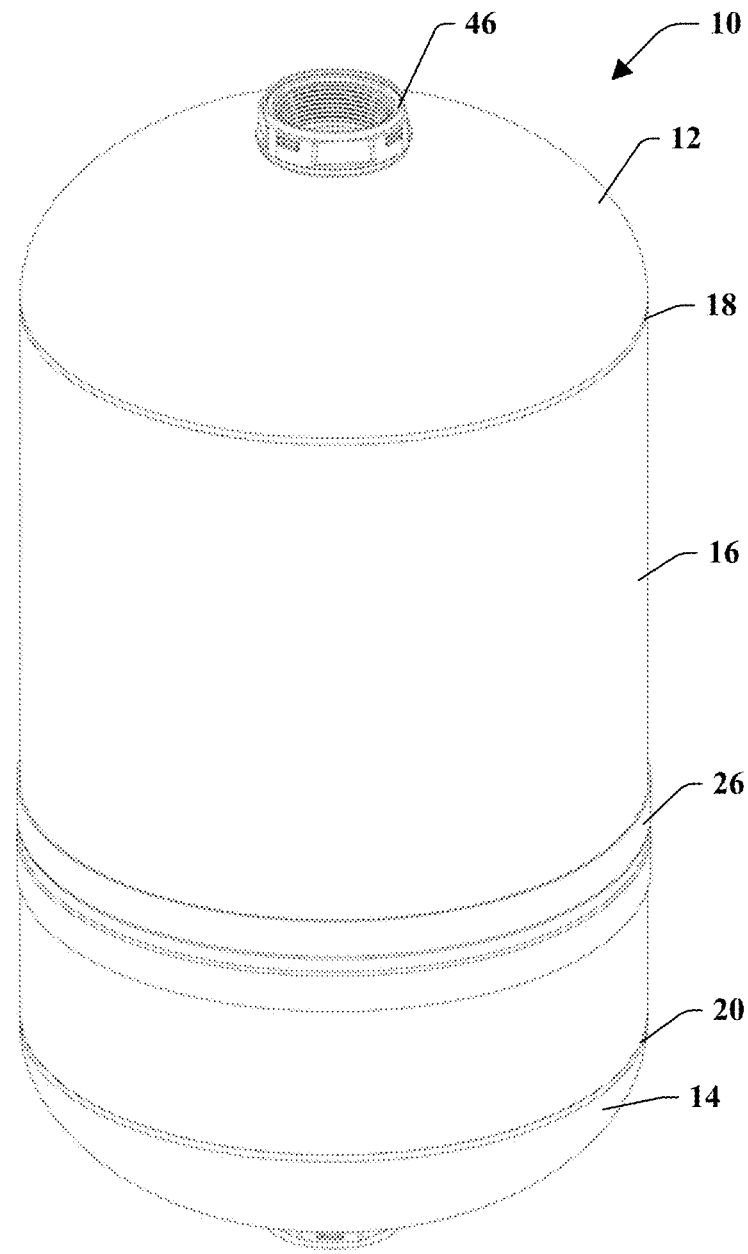
FIG. 1 is a perspective view of an exemplary tank.
Figure 2:
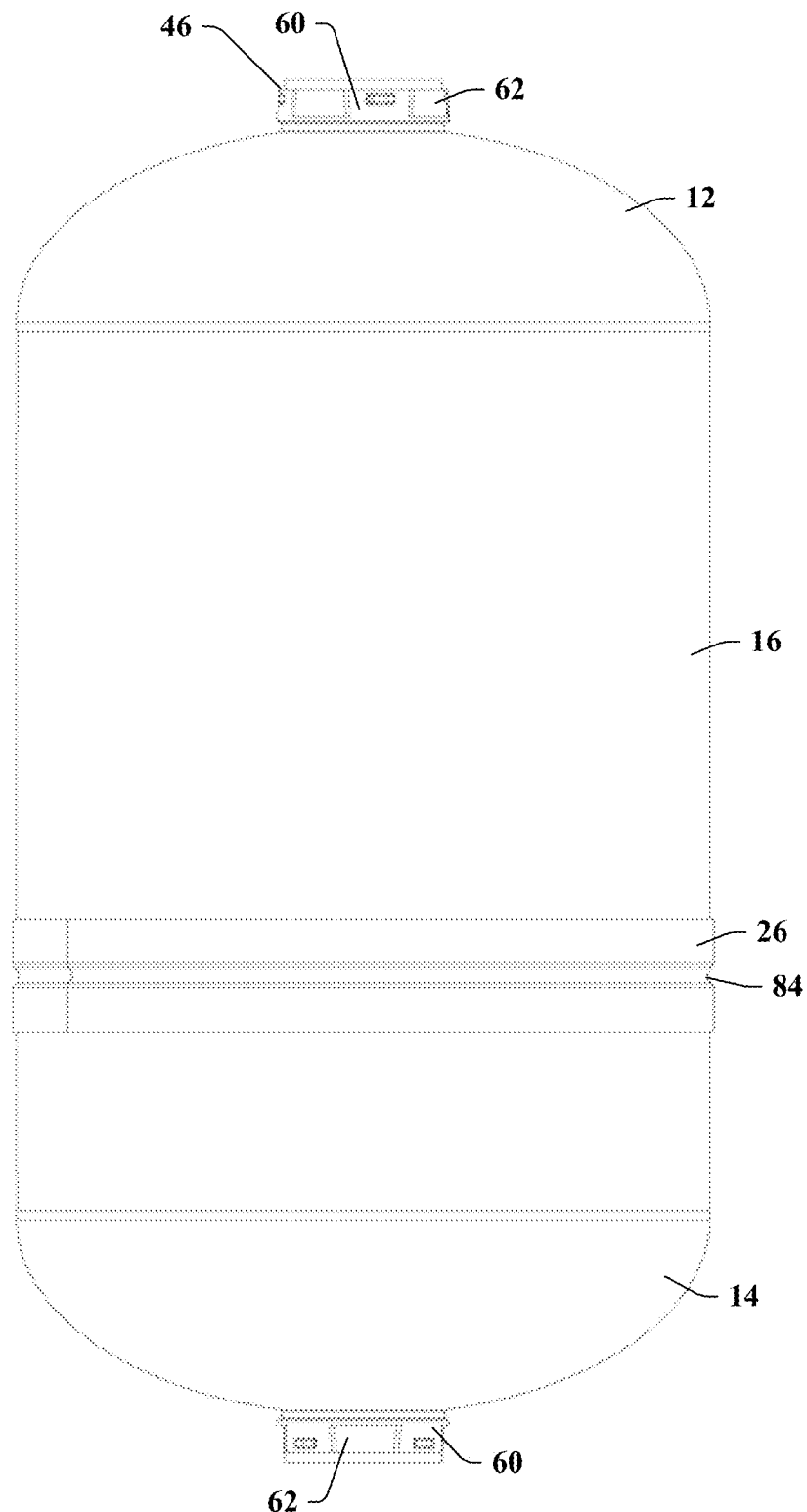
FIG. 2 is a front view of the tank.
Figure 3:
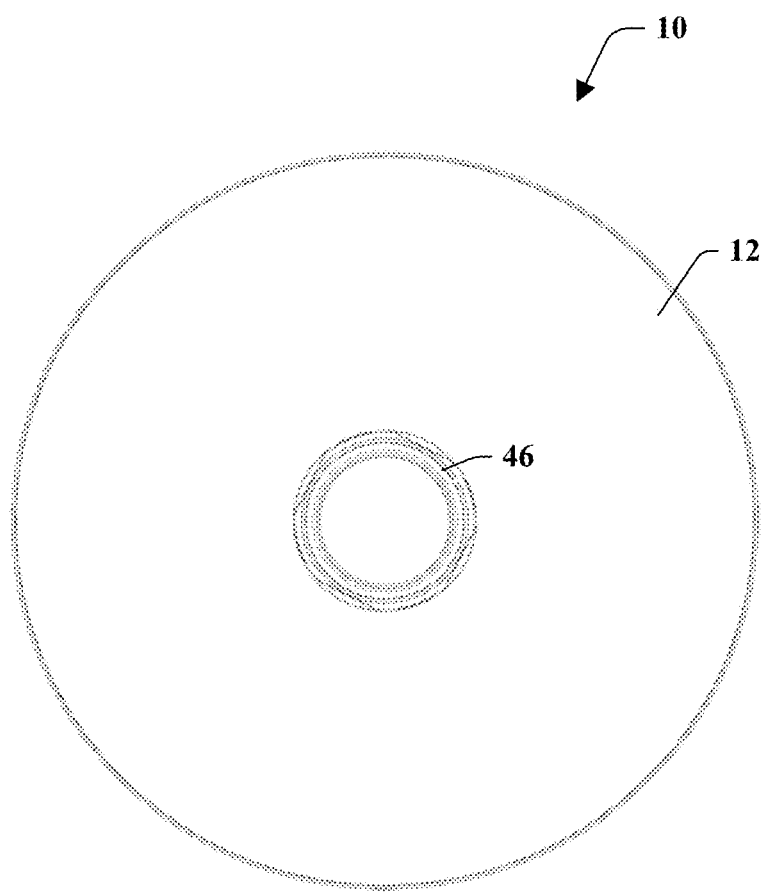
FIG. 3 is a top view of the tank.
Figure 4:
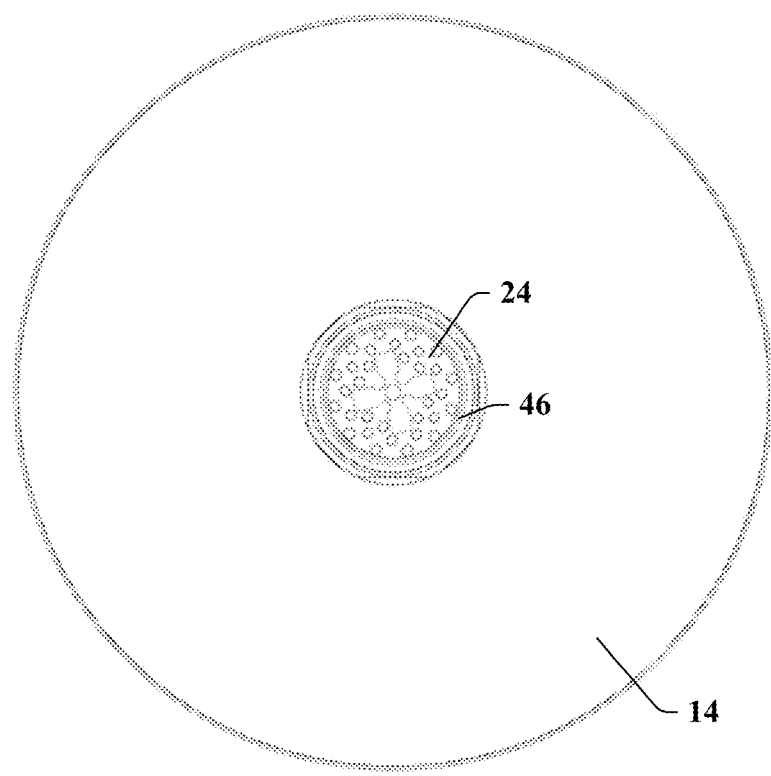
FIG. 4 is a bottom view of the tank.
Figure 5:
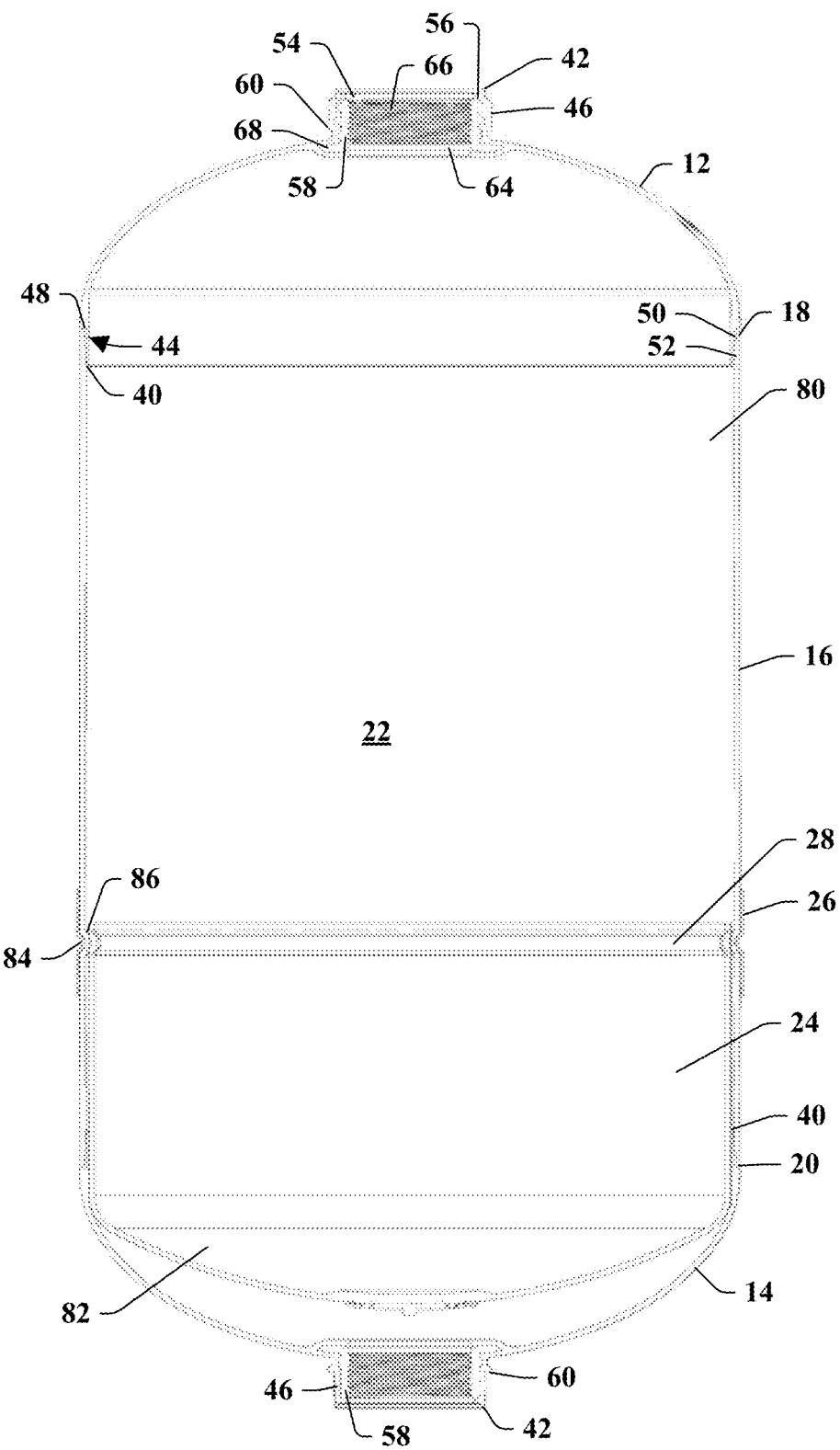
FIG. 5 is a cross-sectional view taken about line 5-5 in FIG. 2.
Figure 6:
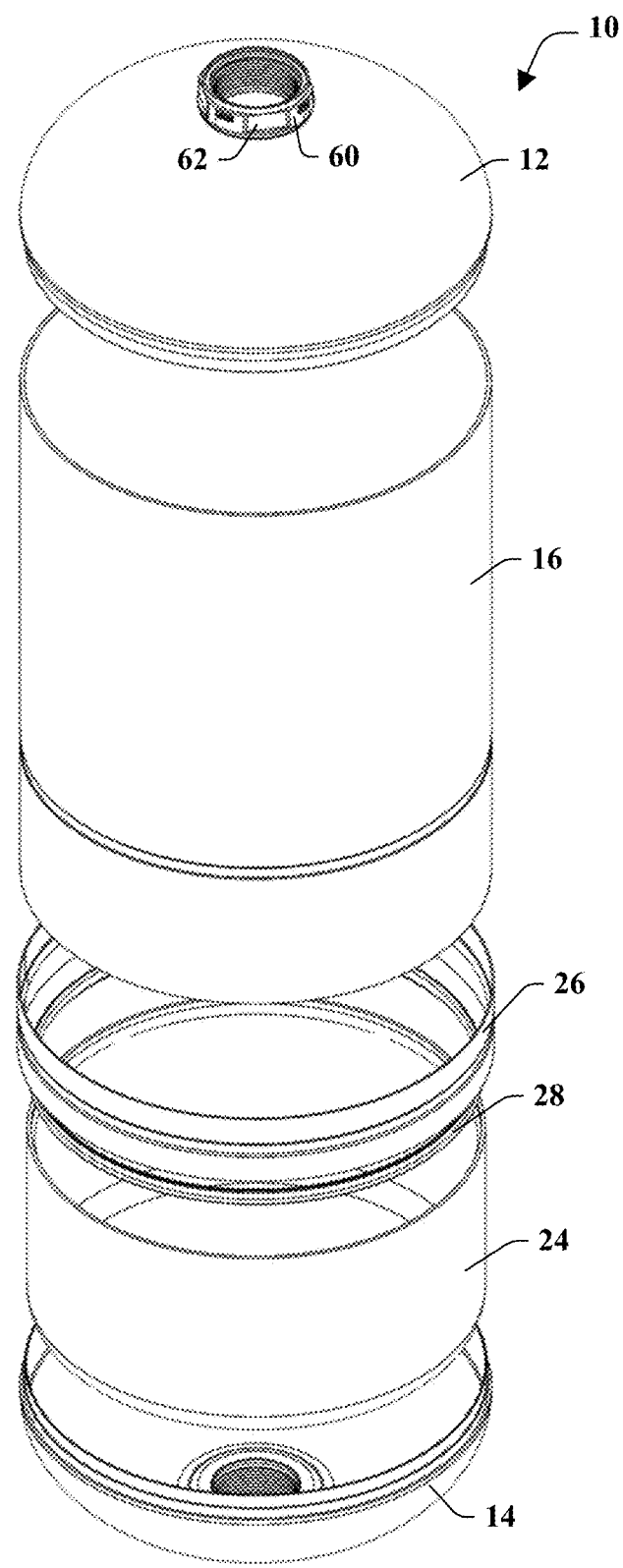
FIG. 6 is an exploded view of the tank.

Embodiments of the invention relate to methods and systems that relate to a tank including a polymeric upper dome having a neck with a through passage, a polymeric lower dome having a neck with a through passage, a polymeric shell having a first end connected to the upper dome and a second end connected to the lower dome, and a connection attached to each of the upper and lower domes in the through passages of the necks, the connections being the same as one another, wherein the upper dome, lower dome, and shell form a cavity.

With reference to the drawings, like reference numerals designate identical or corresponding parts throughout the several views. However, the inclusion of like elements in different views does not mean a given embodiment necessarily includes such elements or that all embodiments of the invention include such elements. The examples and figures are illustrative only and not meant to limit the invention, which is measured by the scope and spirit of the claims.

Turning now to FIGS. 1-6, an exemplary fluid tank is illustrated generally at reference numeral 10. The fluid tank 10 may be a composite tank, such as a Type IV fiberwound tank for use as a well or expansion tank. The fluid tank 10 includes an upper dome 12, a lower dome 14, and a shell 16 having a first end 18 connected to the upper dome 12 and a second end 20 connected to the lower dome. The tank 10 can include a fiberwinding layer, that can, for example, be made of a suitable composite, such as an epoxy glass fiber resin matrix. The upper dome 12, lower dome 14, and shell 16 form a cavity 22 for receiving a diaphragm 24 that is held in position by an outer band 26 and an inner hoop ring 28 as will be described below. The upper and lower domes 12 and 14 and the shell 16 may be made of a suitable material, such as polypropylene, and may be a suitable color, such as black or dark blue to prevent bacteria growth. In an embodiment, the upper and lower domes 12 and 14 may be injection-molded domes made of a polymer, such as a polyolefin, such as a polypropylene copolymer and the shell 16 may be extruded and made of a polymer, such as a polyolefin, such as a polypropylene copolymer. The upper and lower domes may be the same as one another for ease of manufacture.

Figure 7:
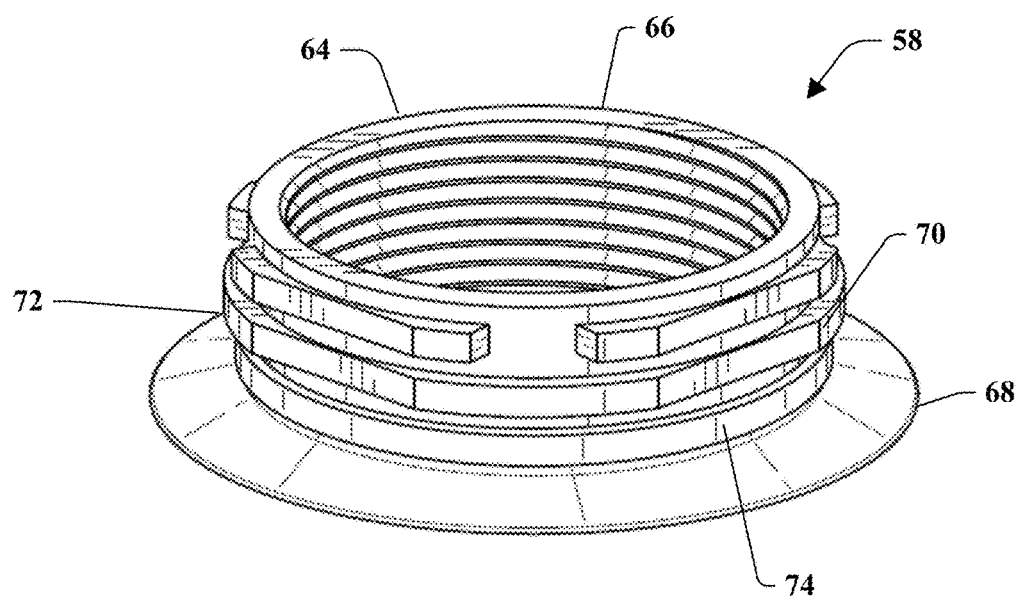
FIG. 7 is a perspective view of a connection of the tank.
Figure 8:
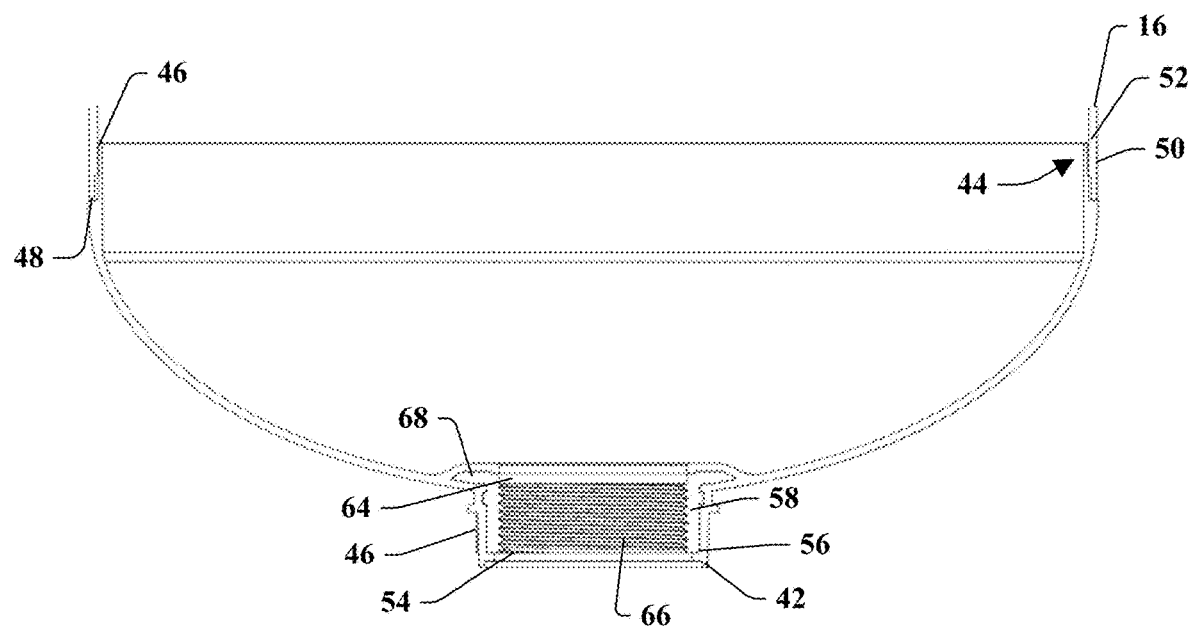
FIG. 8 is an enlarged cross-sectional view of a portion of the tank.

Referring additionally to FIGS. 7 and 8, each dome 12 and 14 has a first end 40 and a second end 42, a lead-in 44 proximate the first end 40 for connection to the respective first or second end 18 or 20 of the shell 16, and a neck 46 at the second end 42. The lead-ins 44 each include an annular base 48 against which an end face of the first or second ends 18 or 20 abut and first and second diameter portions 50 and 52 that are progressively smaller than an outer diameter of the domes 12 and 14 to form a gap between the shell 16 and the domes 12 and 14. Once the domes 12 and 14 and shell 16 are positioned relative to one another, they are connected, for example by spin welding, to form a hermetical seal between one another. The lead-ins 44 allow for ease of assembly and provide a tank where the outer surfaces of the domes 12 and 14 and the shell 16 are substantially flush with one another.

The neck 46 of each dome 12, 14 defines a through passage 54 into the cavity 22 and includes a radially inwardly extending annular rib 56 serving as a seat for a seal to ensure a seal is made between the neck 46 and a respective connection 58 to prevent leakage, for example from water and/or air. The neck also includes a radially outwardly extending annular rib 60 along its outer surface configured to capture composite material in a manner that will support the connection attached to the neck 46 and keep the connection in position when under high burst pressures. The radially outwardly extending annular ribs 60 each include a plurality of circumferentially spaced flats 62.

The connections 58 are received in the through passage 54 of the respective dome 12, 14 and attached to the respective dome 12, 14 in a suitable manner, such as by insert molding. The connections 58 may be made of a suitable material, such as a polymer, such as a polypropylene copolymer, such as a glass-filled polypropylene. The connections 58 each have a through passage 64 with threads 66 along an inner surface thereof and a flange portion 68 received in a corresponding area in the domes 12 and 14. The threads 66 may be a suitable thread, such as a two and one half inch NPSM thread utilized in the water treatment industry. As shown in FIG. 7, the connections 58 additionally can include one or more annular ribs 70 on the outer surface that promote adhesion with the domes 12 and 14. As shown, the connections 58 include a plurality of annular rips spaced from one another along a length of the connection 58 that each include flats 72, such as molded-in flats that provide an anti-rotation feature. The connections 58 additionally include an annular rib 74 extending around the connection 58 proximate the flange portion 68. The connections 58 on the upper and lower domes 12 and 14 can be the same to allow the tank 10 to receive various attachments interchangeably to be used in various industries.

Referring again to FIG. 6, the attachment of the diaphragm 24 will be described in detail. The diaphragm 24 may be a flexible diaphragm made of a suitable material, such as butyl rubber, that is positioned within the cavity 22 and connected to an inner diameter surface of the shell 16 to separate the cavity 22 into an upper portion 80 and a lower portion 82. The upper portion 80 is sealed to contain a pressurized gas, for example, and the lower portion 82 is sealed to contain a pressurized fluid, for example. The diaphragm 24 is connected to the shell 16 prior to at least one of the upper and lower domes 12 and 14, and may be positioned and pushed inside the shell 16 to a programmed location by a mandrel. The inner hoop ring 28 is operatively connected to an inner surface of the diaphragm 24 to hold the diaphragm 24 in place against the shell 16. The outer band 26 can be inserted over the shell 16 and grooved such that a hoop groove 84 of the band 26 mates with a hoop groove 86 of the shell 16, and the hoop groove 86 mates with the inner hoop ring 28 to pinch the diaphragm 24 between the hoop groove 86 of the shell 16 and the inner hoop ring 28. It is contemplated that the band 26 and inner hoop ring 28 are made from a metallic material, such as steel. Although described as including the diaphragm 24, it will be appreciated that the tank may be provided without a diaphragm for use in industries such as the water treatment industry.

Figure 10:
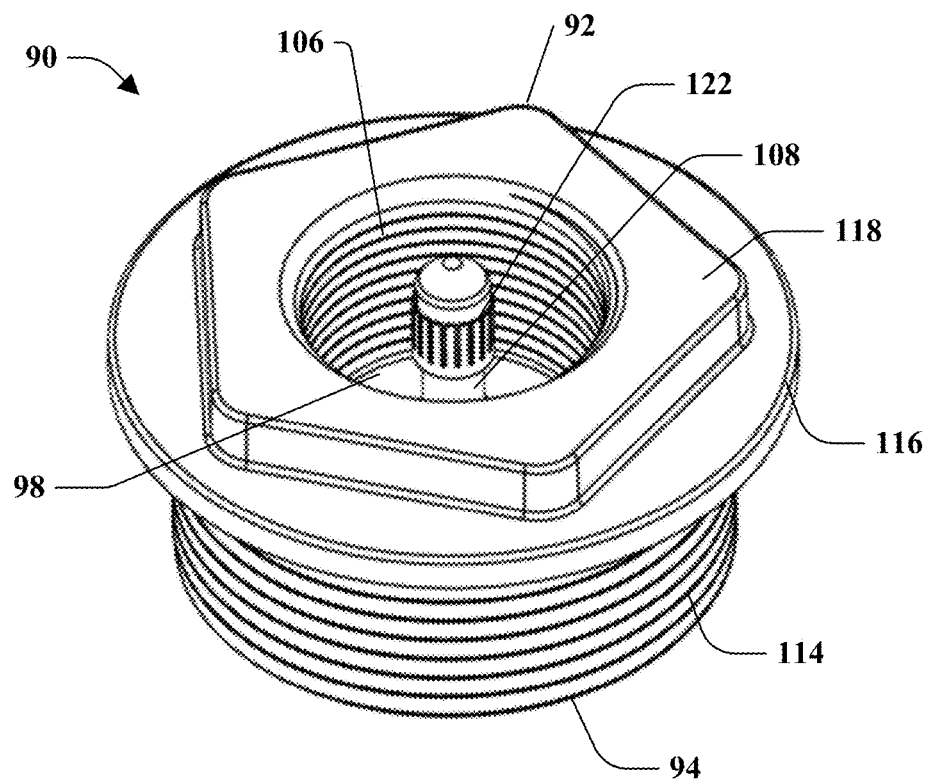
FIG. 10 is a perspective view of an air connector configured to attach to the tank.
Figure 11:
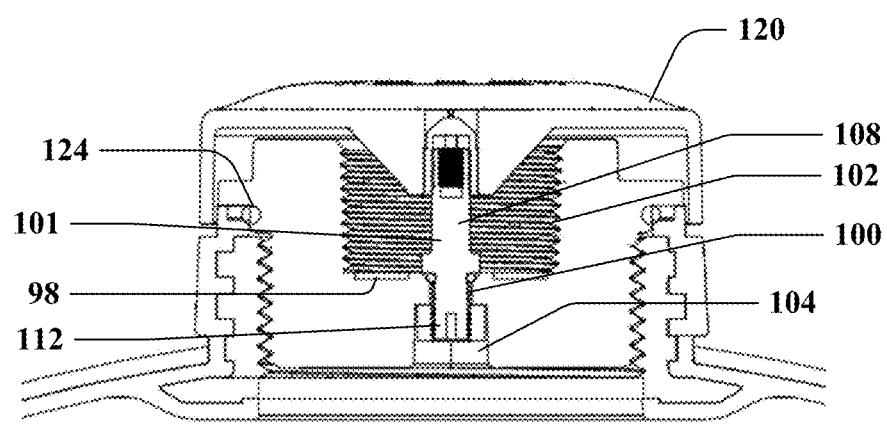
FIG. 11 is a partial cross-sectional view of a top of the tank.
Figure 12:
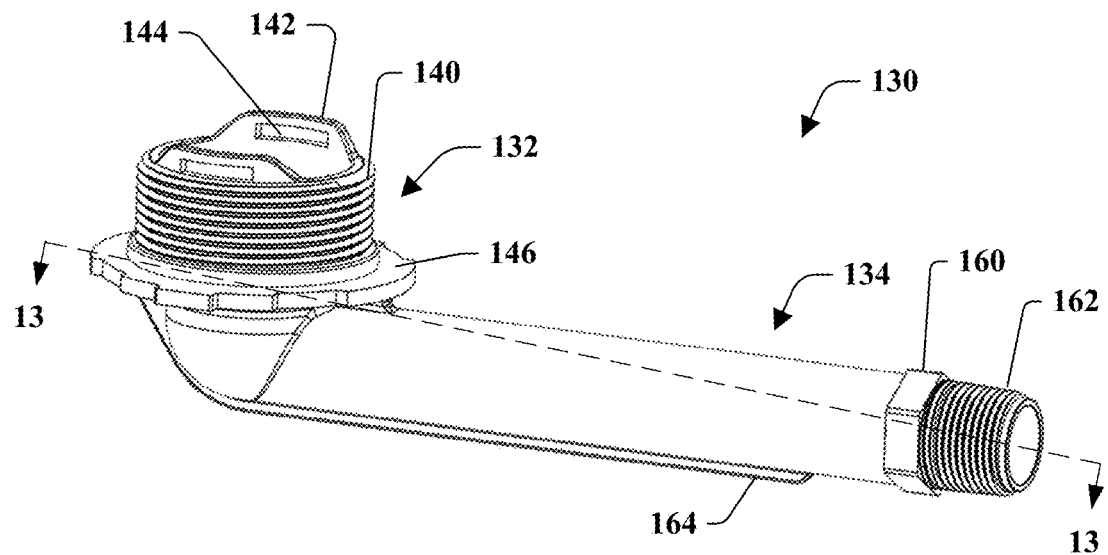
FIG. 12 is a perspective view of a connection configured to attach to the tank.
Figure 13:
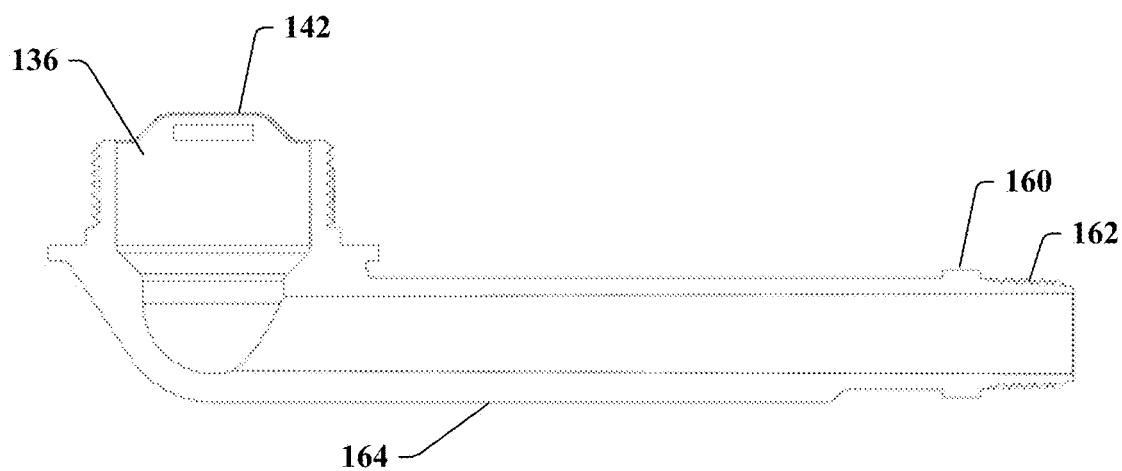
FIG. 13 is a cross-sectional view taken about line 13-13 in FIG. 12.

Turning now to FIGS. 10 and 11, an exemplary air connector 90 configured to be coupled to the connection 58 of the upper dome 12 is shown. The air connector 90 may be made of a suitable material, such as a polymer, for example a polypropylene copolymer, such as a glass-filled polypropylene that adds rigidity and provides a sufficient sealing surface for the air stem. The air connector 90 has first and second ends 92 and 94 and a passage 96 extending therethrough. A radially inwardly extending portion 98 having an opening 100 extends from an inner wall that defines the passage 96 to separate the passage 96 between an upper portion 102 and a lower portion 104. Threads 106 are provided on the inner wall at the upper portion 102 that may be a suitable thread, such as one and one quarter inch NPT threads. An air stem 108 can be received in the opening 100 with a first portion 110 extending in the upper portion 102 and a second portion 112 extending in the lower portion 104. The first portion 110 sits below the first end 92, for example to prevent damage to the air stem 108 and to allow standard air-chucks to be attached for charging the tank 10 with air or gas or for removing air or gas from the tank, and can be covered by a suitable cover 122. In an embodiment, the air connector 90 can be provided without the air stem 108 and the radially inwardly extending portion 98 can be drilled out allowing the NPT threads to be utilized in a retention tank application.

Figure 9:
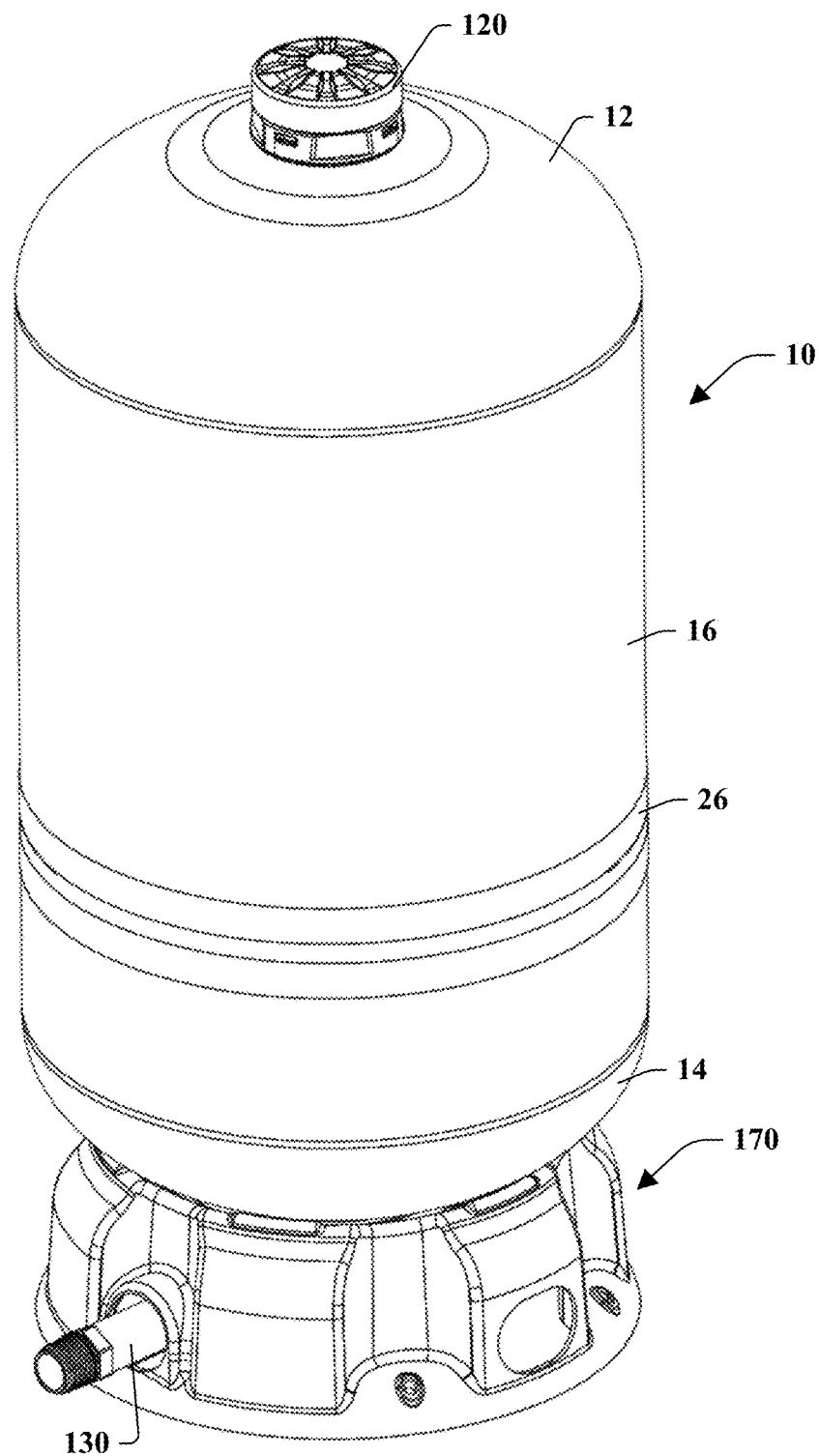
FIG. 9 is a perspective view of an exemplary tank assembly.

The air connector 90 also includes threads 114 along an outer surface for mating with the threads 66 of the connection 58, and a flange 116 extending outward for abutting the second end 42 of the upper dome 12. The threads 114 may be a suitable thread, such as a two and one half inch NPSM thread utilized in the water treatment industry. A suitable seal 124 is configured to be received in the seat formed by the annular rib 56 and sandwiched between the annular rib 56 and the flange 116. The air connector 90 may also include a polygonal raised portion 118 at the first end 92, such as a pentagon shaped portion, for torqueing the air connector 90 onto the connection 58. The shaped of the polygonal raised portion 118 is designed to prevent tampering from standard wrenches. As shown in FIGS. 9 and 11, a cap 120 can be attached to the air connector 90 to cover the air stem 108.

Turning now to FIGS. 12-15, an exemplary connector 130, such as a threaded elbow connector is configured to be coupled to the connection 58 of the lower dome 14. The connector may be made of a suitable material, such as polyvinyl chloride, and may be made in a suitable manner, such as injection molding. The connector 130 includes an inlet portion 132 and a conduit 134 extending substantially perpendicular to the inlet portion 132. The inlet portion 132 and the conduit 132 each have a respective through passage 136 and 138 fluidly connected to one another to direct flow ninety degrees relative to the connection 58. The inlet portion 132 includes threads 140 along an outer surface for mating with the threads 66 of the connection 58 attached to the lower dome 14, a pair of ears 142 opposite one another extending above the threads 140 and each having an opening 144, and a flange 146 extending outward below the threads 140 for connection to a support stand. The threads 140 may be a suitable thread, such as a two and one half inch NPSM thread utilized in the water treatment industry.

Figure 14:
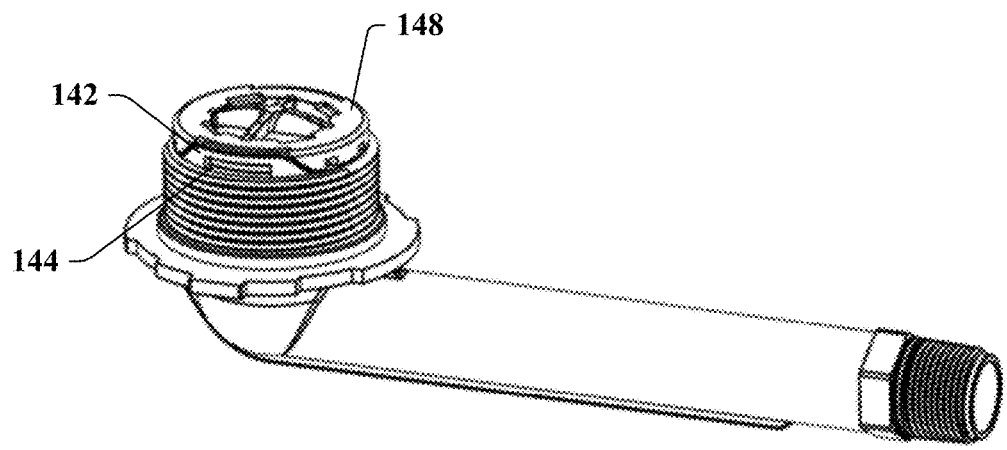
FIG. 14 is a perspective view of the connection with a turbulator.
Figure 15:
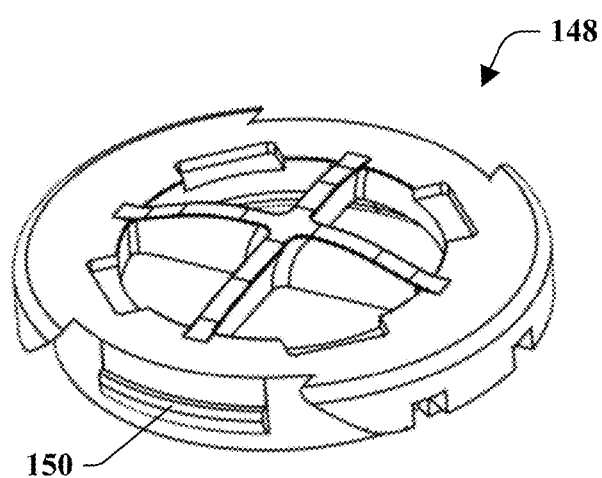
FIG. 15 is a perspective view of the turbulator.

As shown in FIGS. 14 and 15, the ears 142 are configured to connect to a turbulator 148 via protrusions 150 extending outward from the turbulator 148 that are received in the openings 144. It will be appreciated that another suitable connector, such as a support or a diffuser may connect to the ears 142, such as by a snap-in connection. A suitable seal, such as O-ring 152 can be received on the inlet portion 132 to be received in the seat formed by the rib 56 to seal the inlet portion 132 to the connection 58.

Figure 18:
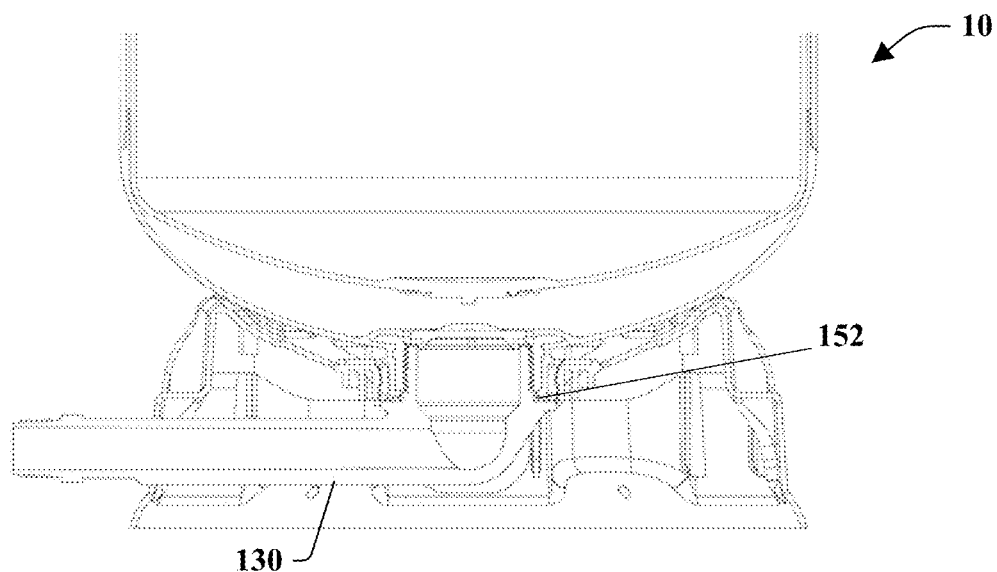
FIG. 18 is a partial cross-sectional view of the tank attached to the support stand and the connection.

Referring now to the conduit 134, the conduit 134 includes a molded-in hex 160 with threads 162 adjacent thereto for connection to another conduit. The threads 162 may be a suitable thread, such as one and one quarter inch NPT threads or one-inch NPT threads. In an embodiment, the hex 160 and threads 162 could be removed by a user, for example cut off by a plumber, and a suitable conduit could be glued to the conduit 134. The length of the conduit 134 is sized such that the conduit can extend through and beyond a sidewall of the support stand a sufficient distance allowing the hex 160 and threads 162 to be removed and the end of the conduit still extend past the sidewall as shown in FIG. 18. The conduit 134 also includes a support rib 164 on an underside thereof configured to bottom out on the support stand when weight is applied to the connector 130 to impeded downward movement of the conduit 134 and transfer stress to the support stand, for example if a user stepped on the conduit 134. As shown, the support rib 164 extends substantially along the length of the conduit 134.

Figure 16:
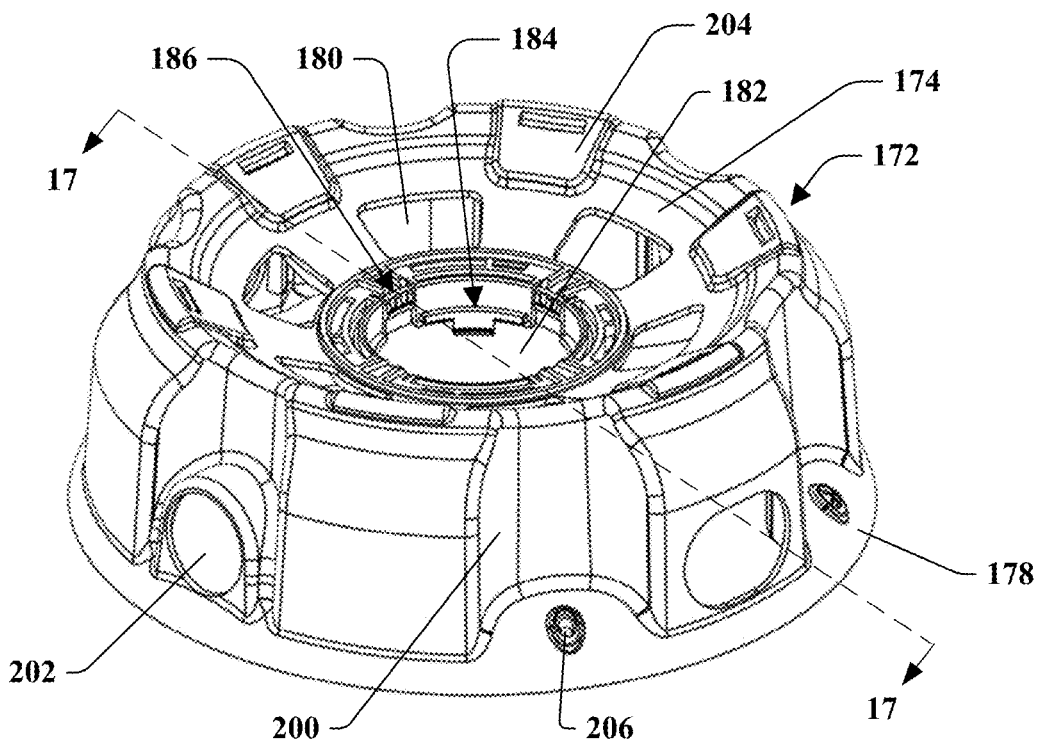
FIG. 16 is a perspective view of a support stand configured to attach to the tank.
Figure 17:
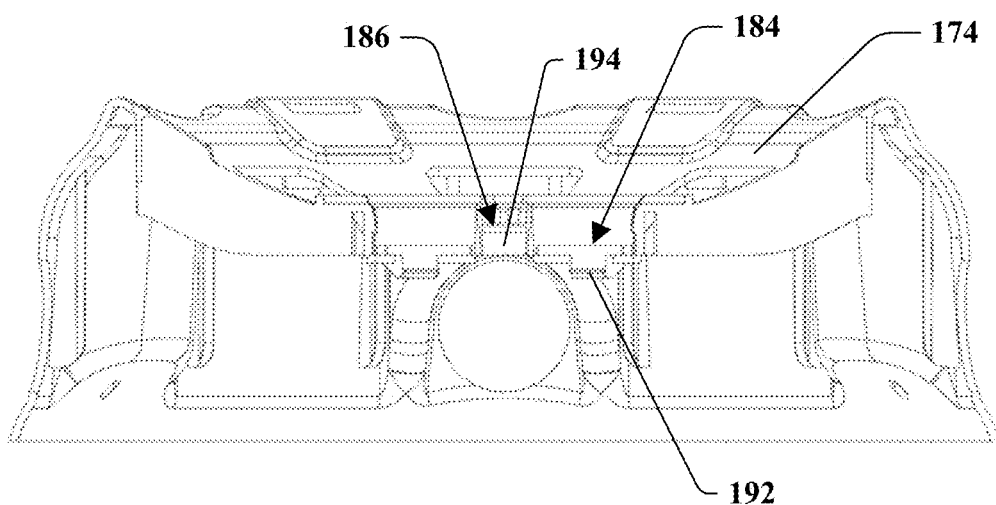
FIG. 17 is a cross-sectional view of the support stand taken about line 17-17 in FIG. 16.

Turning now to FIGS. 16-18, an exemplary support stand for connection to the tank 10 is shown at reference numeral 170. The support stand 170 may be made of any suitable material, such as a polymer, such as a polypropylene copolymer, and made in a suitable manner, such as injection molding. The support stand 170 includes a support body 172 having an upper wall 174, a sidewall 176 extending downwardly from the upper wall 174, and a lower wall 178 extending downward from a lower end of the sidewall 176. A plurality of circumferentially spaced drainage apertures 180 are defined in the upper wall 174 that are adapted to permit airflow and drainage of a liquid through the upper wall 174.

Figure 19:
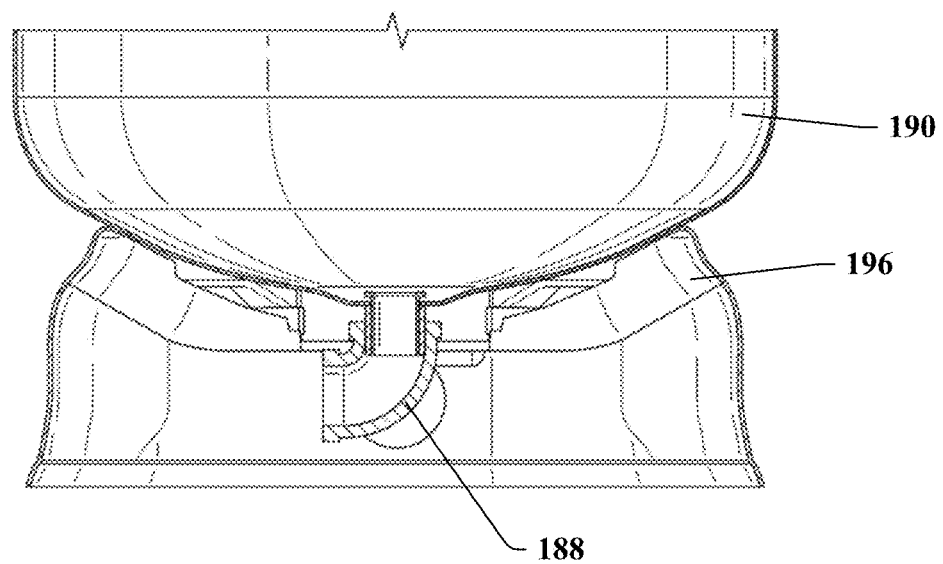
FIG. 19 is a partial cross-sectional view of a metal tank attached to the support stand and a connection.

Also defined in the upper wall 174 is a locking aperture 182 that permits passage of components of the tank 10. As shown in FIG. 17, extending from the locking aperture 182 are first and second attachment mechanisms 184 and 186 for attaching to the connector 130 as shown in FIG. 18 or a connector 188 attached to a metal tank 190 as shown in FIG. 19. The first attachment mechanism 184 includes a plurality of spaced tabs 192 that connect to the flange 146 of the connector 130, for example via snap connection, to secure the connector 130 to the stand to allow the tank 10 to be threadably connected to the connector 130/stand 170 via the connection 58. The second attachment mechanism 186 includes one or more tabs 194 that connect to a ring 196 attached to the tank 190, for example by welding, and then the connector 188 is secured to the ring 196.

The sidewall 176 includes a plurality of circumferentially spaced concave recesses 200 that enhance the rigidity of the support body 172 and provide for increased strength when rolling the tank 10, and a plurality of circumferentially spaced access apertures 202 through which the conduit 134 of the connector 130 may extend. In an embodiment, four access apertures 202 may be provided for utilization in the water treatment industry. The sidewall 176 also includes a plurality of circumferentially spaced standoffs 204 that can alternate with the recesses to facilitate air circulation below the underside of the tank, for example to help prevent buildup of condensation, and a plurality of openings 206 in the lower wall to allow the support stand 170 to be attached a floor or other component as described below.

Figure 20:
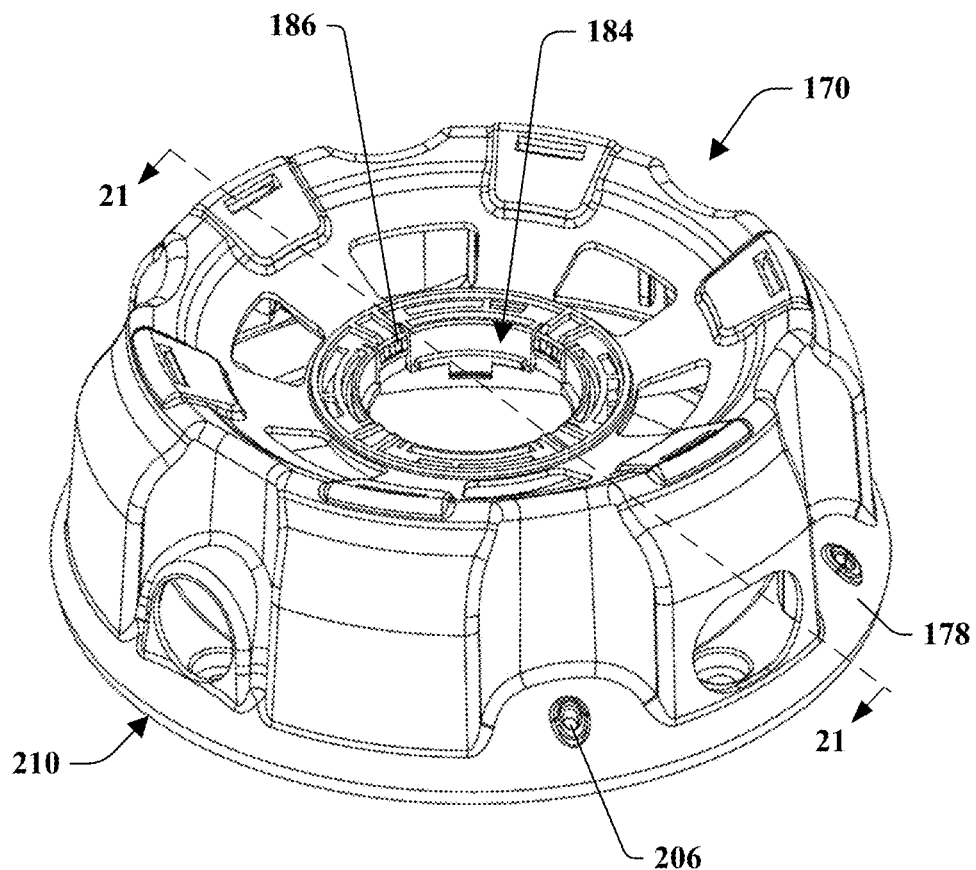
FIG. 20 is a perspective view of a support stand on a leveling ring.
Figure 21:
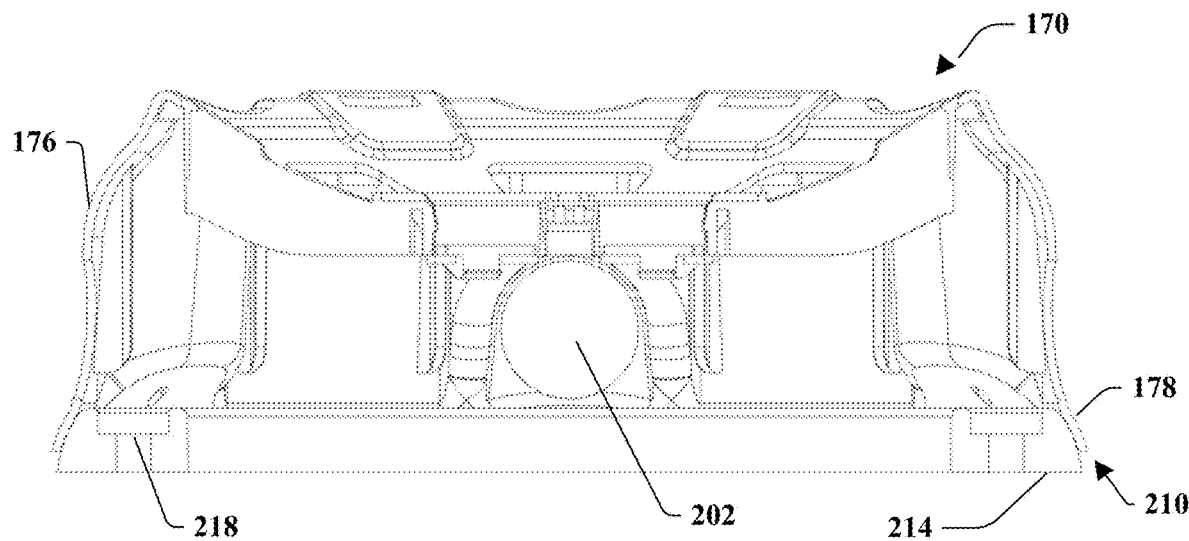
FIG. 21 is a cross-sectional view taken about line 21-21 in FIG. 20.
Figure 22:
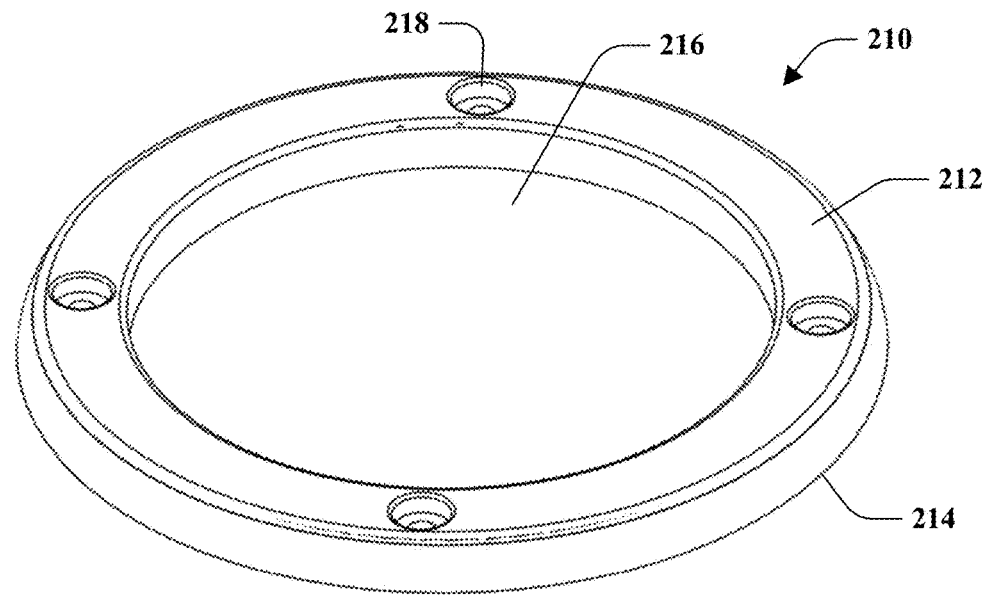
FIG. 22 is a perspective view of the leveling ring.

Turning now to FIGS. 20-22, the support stand 170 is shown with a leveling ring 210. The leveling ring 210 has a geometry corresponding to a geometry of the support stand 170 at the lower wall 178 to allow the support stand 170 to abut the leveling ring 210 and be moved relative to the leveling ring to level the tank 10. The leveling ring 210 has a first end 212 configured to be abutted by an underside of the lower wall 178, a second end 214 configured to abut a surface, such as a floor in a building, and an opening 216 extending therethrough for material savings. The leveling ring 210 can include one or more openings 218, such as a plurality of circumferentially spaced openings 218 for receiving a fastener to secure the leveling ring to the floor providing for seismic restraint. It will be appreciated that the leveling ring 210 may be secured to a floor in other suitable manners.

To attach the support stand 170 to the leveling ring 210, the leveling ring 210 is positioned on the surface and optionally attached to the surface. The support stand 170 is then lowered onto the leveling ring 210 and the support stand 170 swiveled relative to the leveling ring 210. A suitable level may be provided that is placed on the top of the tank 10 or integrated with the tank for an operator to confirm that the tank 10 is leveled. Once leveled, suitable fasteners are inserted through the openings 206 and into the leveling ring 210 to secure the support stand 170 and thus the tank 10 relative to the leveling ring 210. By leveling the tank the service life of the diaphragm will be increased due to uniform actuation.

Figure 23:
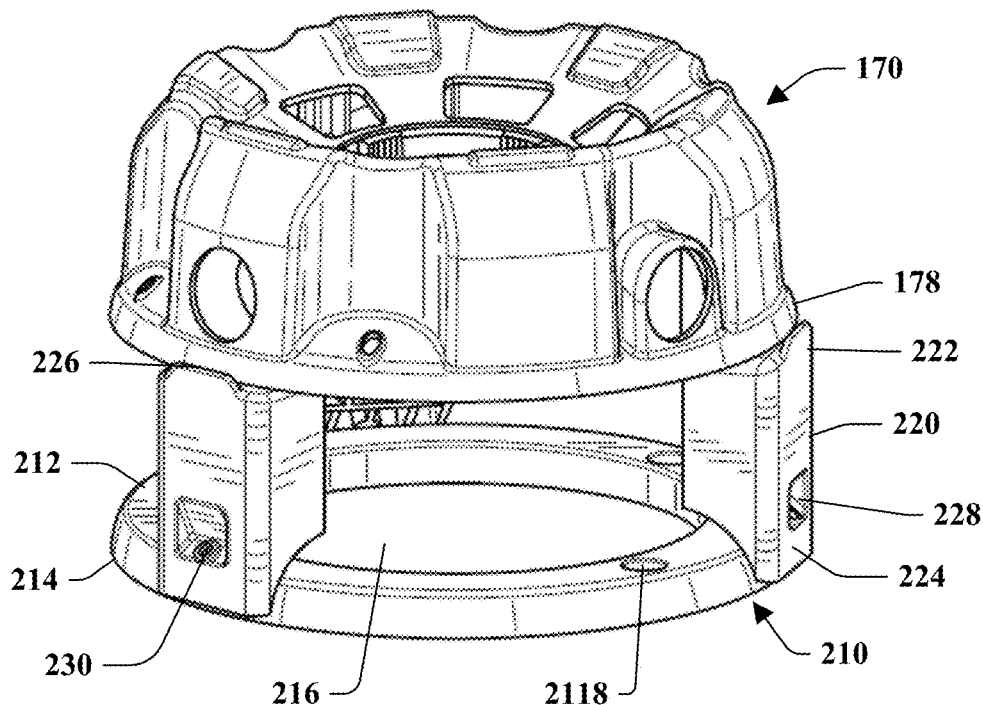
FIG. 23 is a perspective view of the support stand elevated above the leveling ring by legs.

Turning now to FIG. 23, an embodiment for elevating the support stand 170 is shown. In some instances it is desirable to raise the tank 10 a predetermined distance above ground level, such as eighteen inches, for example to meet code requirements,. To raise the support stand 170, a plurality of legs 220, such as three circumferentially spaced legs 220 may be provided. Each leg 220 has a first end 222 against which the lower wall 178 of the support stand 170 abuts and a second end 224 that abuts the leveling ring 210. Projecting upward from each first end 222 is a standoff 226 that abuts an outer edge of the lower wall 178 to hold the support stand 170 in position. In an embodiment, the support stand 170 can be secured to the legs 220 by a snap-in feature or a suitable fastener.

The second end 224 of each leg 220 has a geometry corresponding to the geometry of the leveling ring 170 to allow the legs 220 to be moved relative to the leveling ring 210 for leveling the tank 10 in a similar manner that the support stand 170 is moved relative to the leveling ring 210 discussed above regarding FIG. 20. A cavity 228 is provided proximate each second end 224 where an opening 230 is provided for receiving a suitable fastener to secure the legs 220 to the leveling ring 210.

Figure 24:
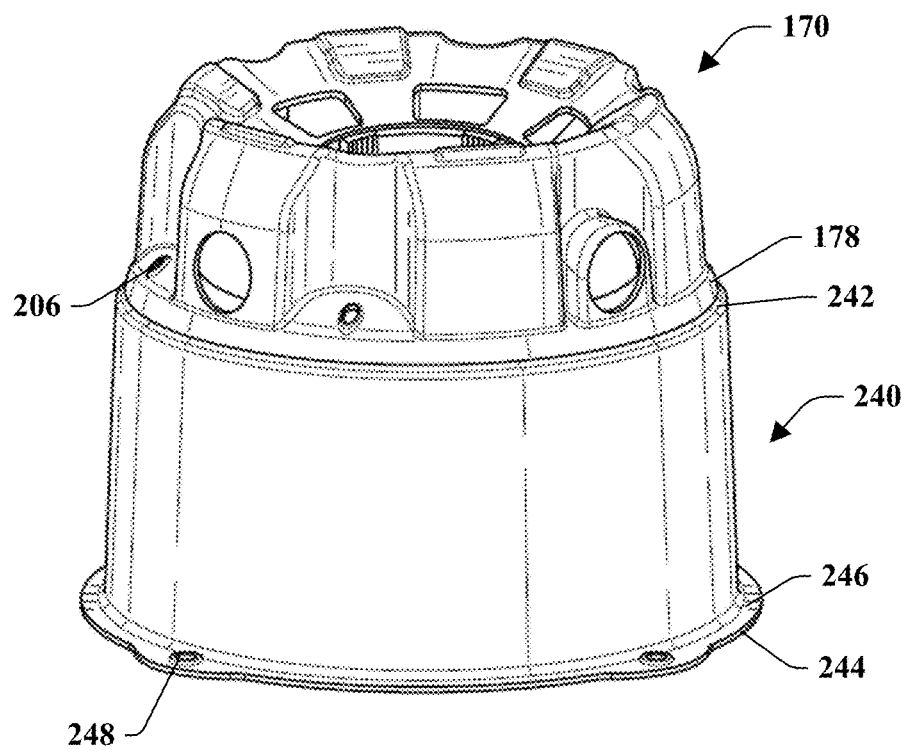
FIG. 24 is a perspective view of the support stand on a leveling base.

Turning now to FIG. 24, another embodiment for elevating the support stand 170 is shown. In this embodiment, a leveling base 240 is provided that has a first end 242 configured to be abutted by an underside of the lower wall 178 and a second end 244 configured to abut a surface, such as the floor in a building. The leveling base 240 has a geometry at the first end 242 corresponding to a geometry of the support stand 170 at the lower wall 178 to allow the support stand 170 to abut the leveling base 240 and be moved relative to the leveling base to level the tank 10. The leveling base 240 includes a flanged portion 246 at the second end 244 that includes one or more openings 248, such as a plurality of circumferentially spaced openings 248 for receiving a fastener to secure the leveling base to the floor providing for seismic restraint. It will be appreciated that the leveling base 240 may be secured to a floor in other suitable manners.

To attach the support stand 170 to the leveling base 240, the leveling base 240 is positioned on the surface and optionally attached to the surface, for example via fasteners received in openings 248. The support stand 170 is then lowered onto the leveling base 240 and the support stand 170 swiveled relative to the leveling base 240. A suitable level may be provided that is placed on the top of the tank 10 or integrated with the tank for an operator to confirm that the tank 10 is leveled. Once leveled, suitable fasteners are inserted through the openings 206 and into the leveling base 240 to secure the support stand 170 and thus the tank 10 relative to the leveling base 240.

Figure 25:
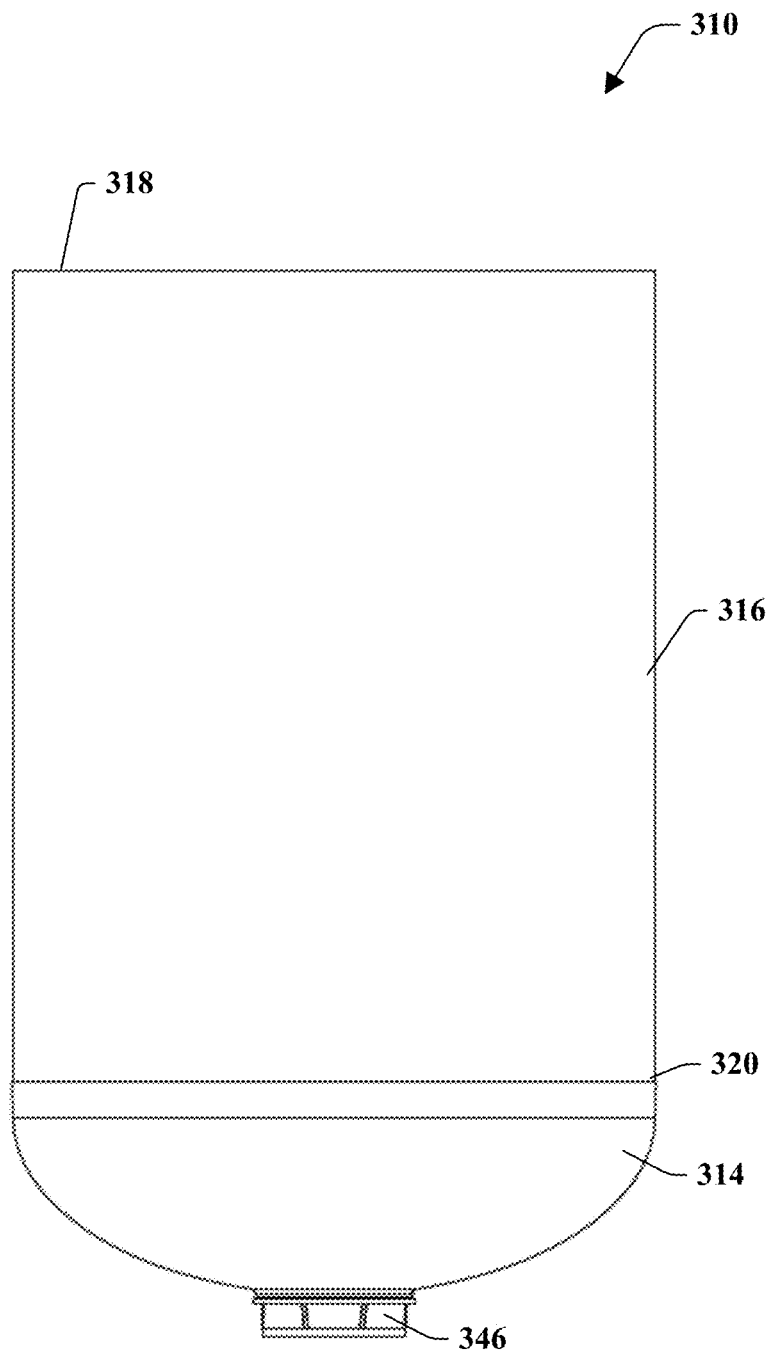
FIG. 25 is a perspective view of a portion of another exemplary tank.
Figure 26:
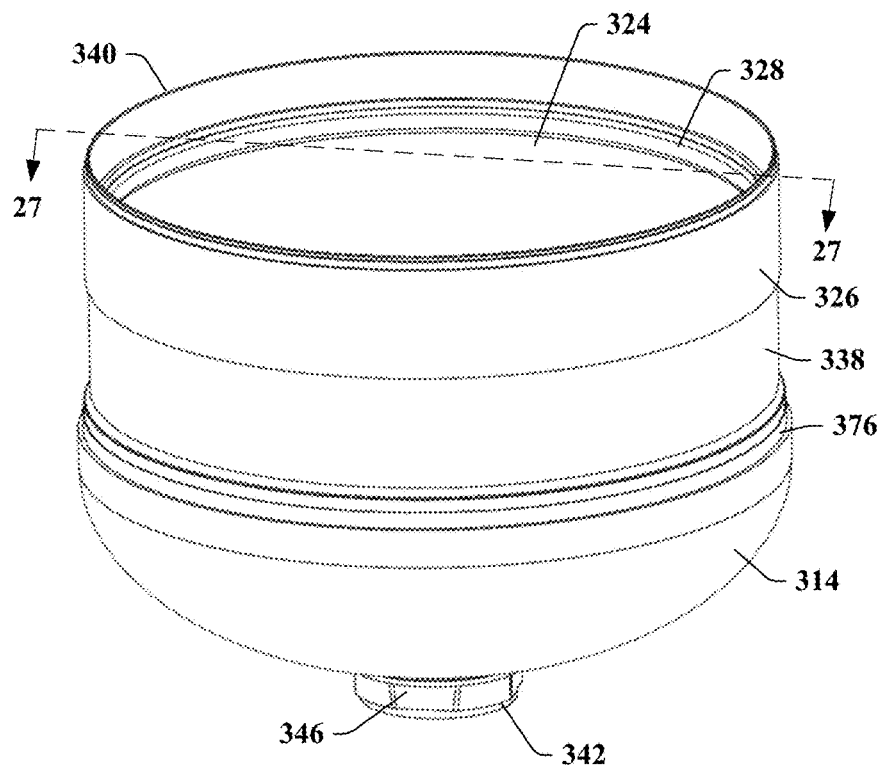
FIG. 26 is a perspective view of a portion of the tank.
Figure 27:
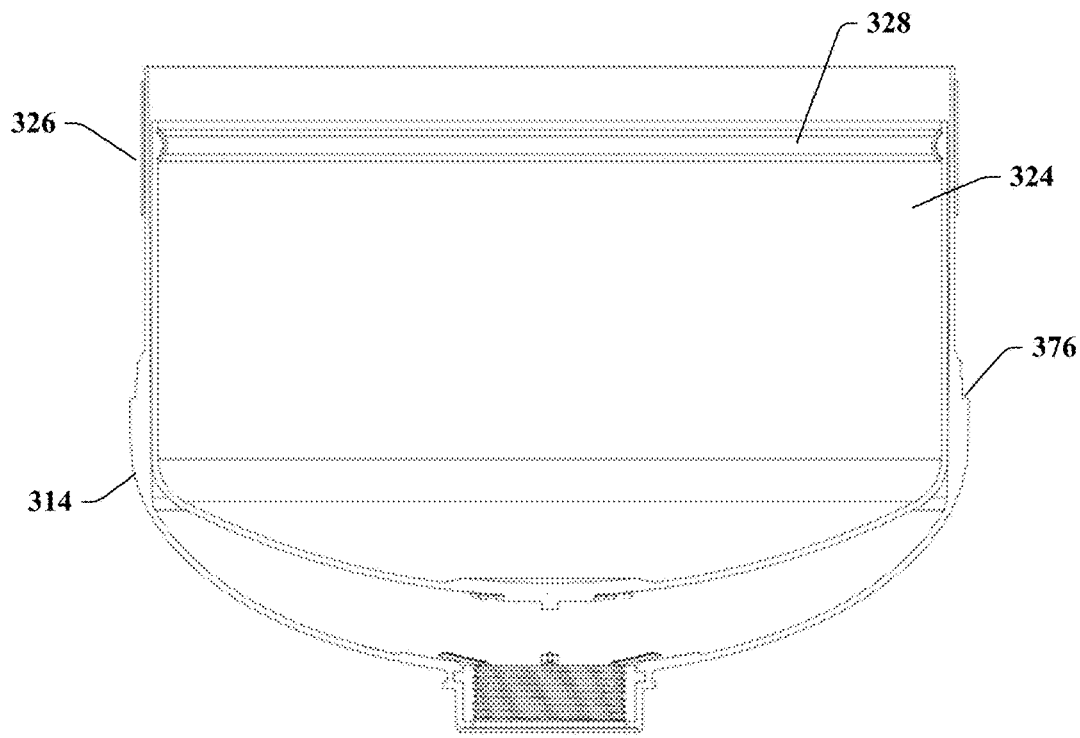
FIG. 27 is a cross-sectional view taken about line 27-27 in FIG. 26.

Turning now to FIGS. 25-27, an exemplary embodiment of the tank is shown at 310. The tank 310 is substantially the same as the above-referenced tank 10, and consequently the same reference numerals but indexed by 300 are used to denote structures corresponding to similar structures in the tanks. In addition, the foregoing description of the tank 10 is equally applicable to the tank 310 except as noted below.

The fluid tank 310 includes an upper dome (not shown), a lower dome 314, and a shell 316 having a first end 318 connected to the upper dome and a second end 320 connected to the lower dome. The upper dome, lower dome 314, and shell 316 form a cavity 322 for receiving a diaphragm 324 that is held in position by an outer band 326 and an inner hoop ring 328. The upper dome, the lower dome 314, and the shell 316 may be made of a suitable material, such as a polymer, such as a polyolefin, such as a polypropylene copolymer, and may be a suitable color, such as black or dark blue to prevent bacteria growth. In an embodiment, the upper dome, lower dome 314, and shell 316 may be gas assist injection-molded components. The gas assist injection molding allows for thicker wall thicknesses without sink marks, the control of tighter tolerances, and aids with insulation on the dome. In an embodiment, an antimicrobial liner and/or antimicrobial dome may be provided in the cavity 322.

The upper dome and the lower dome 314 each have a first end 340, a second end 342, and a neck 346 at the second end 342 as described above regarding the tank 10. The diaphragm 324 is connected to the lower dome 314 before shell 316 is connected to the lower dome 314, and may be positioned and pushed inside the lower dome 314 to a programmed location by a mandrel. The inner hoop ring 328 is operatively connected to an inner surface of the diaphragm 324 to hold the diaphragm 324 in place against the lower dome 314. The outer band 326 can be inserted over the lower dome 314 and located in a suitable manner, such as by a molded-in tab on the lower dome 314. The outer band 326 can be grooved such that a hoop groove of the band 326 mates with a hoop groove of the lower dome 314, and the hoop groove of the lower dome 314 mates with the inner hoop ring 328 to pinch the diaphragm 324 between the hoop groove of the lower dome 314 and the inner hoop ring 328. It is contemplated that outer band 326 and inner hoop ring 328 are made from a metallic material, such as steel. Although described as included the diaphragm 324, it will be appreciated that the tank may be provided without a diaphragm for use in industries such as the water treatment industry.

Once the diaphragm 324 is installed, the shell 316 can be positioned relative to the lower dome 314 and lowered onto the lower dome 314 such that a portion 338 of the lower dome 314 is disposed within the shell 316. In this way, the shell 316 extends past the first end 340 of the lower dome 314 and covers the portion 338 and the outer band 326. As shown, the lower dome 314 includes a ledge 376 extending around the dome 314 that is configured to be abutted by the second end 320 of the shell 316 such that an outer surface of the shell 316 is flush with an outer surface of the lower dome 314 when connected to one another, for example by spin welding, to form a hermetical seal between one another and eliminated uneven surfaces for fiberwinding and reducing stress on the outside surfaces. Once connected, an air gap is formed between the shell 316 and the portion 338 that provides insulation to prevent cold incoming liquid away from the inside of the upper dome 314 eliminating sweating.

Figure 28:
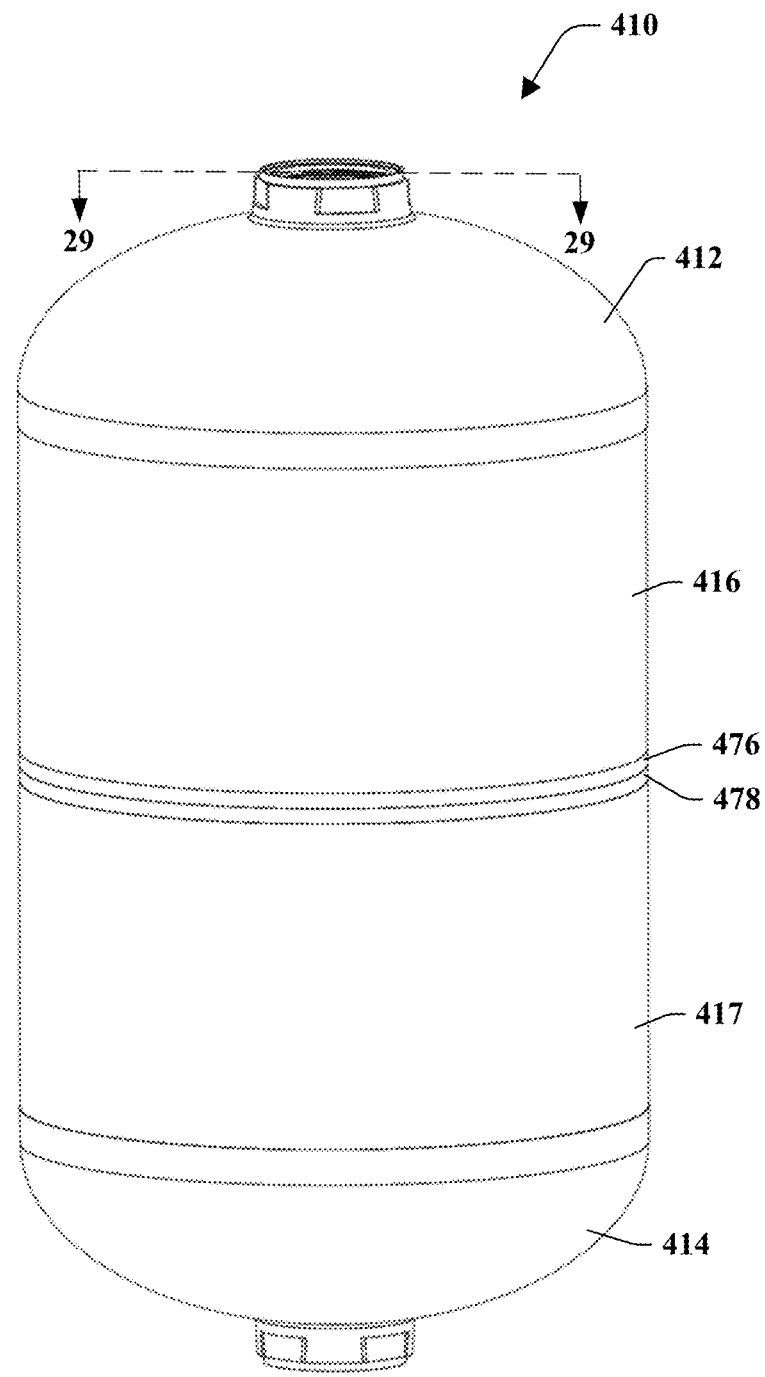
FIG. 28 is a perspective view of yet another exemplary tank.
Figure 29:
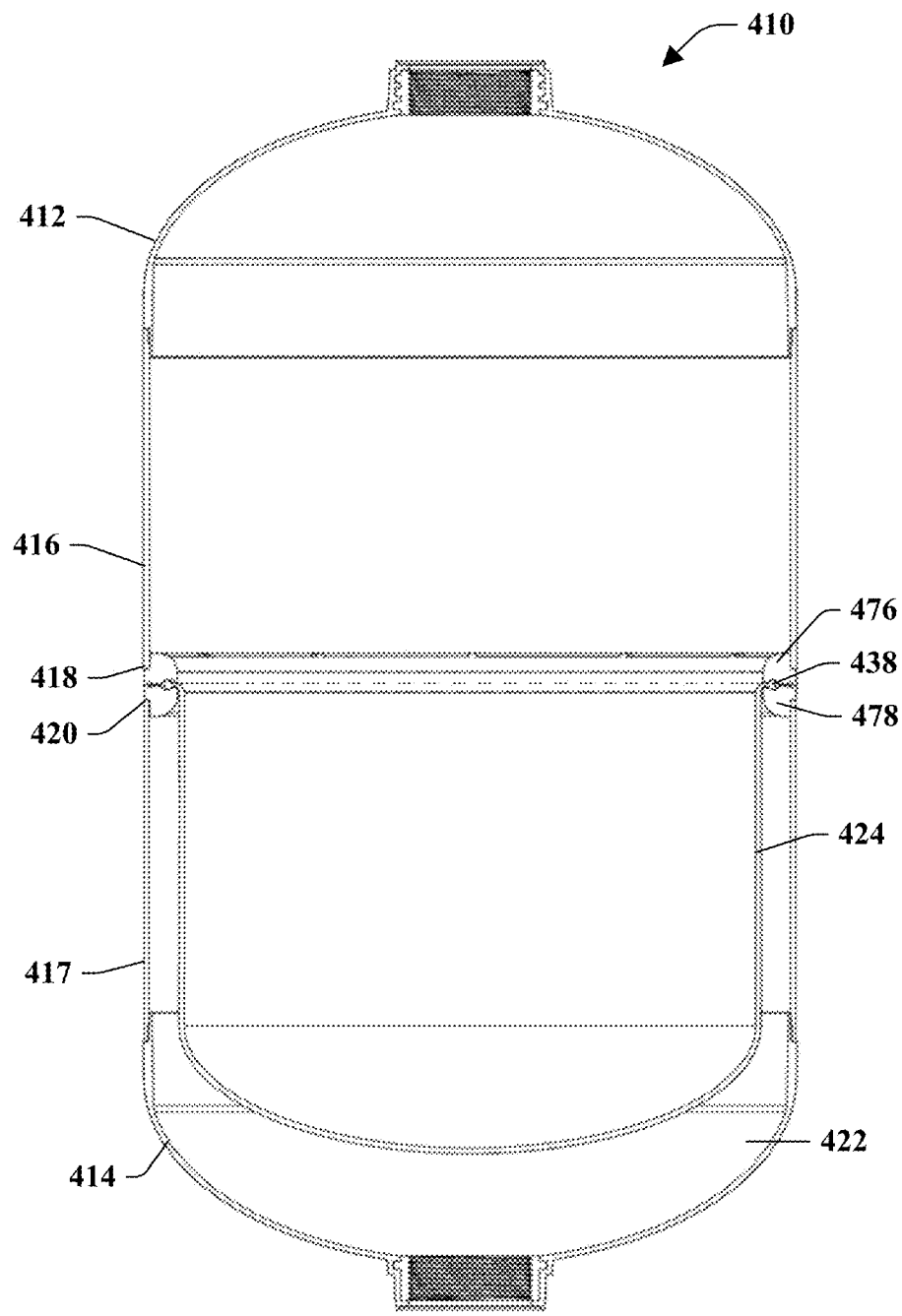
FIG. 29 is a cross-sectional view taken about line 29-29 in FIG. 28.

Turning now to FIGS. 28 and 29, an exemplary embodiment of the tank is shown at 410. The tank 410 is substantially the same as the above-referenced tank 10, and consequently the same reference numerals but indexed by 400 are used to denote structures corresponding to similar structures in the tanks. In addition, the foregoing description of the tank 10 is equally applicable to the tank 410 except as noted below.

The fluid tank 410 includes an upper dome 412, a lower dome 414, an upper shell 416, and a lower shell 417 coupled together and configured to be surrounded by a fiberwinding layer. The upper dome 412, lower dome 414, upper shell 416 and lower shell 417 form a cavity 422 for receiving a diaphragm 424 that is held in position as discussed below. The upper dome 412, lower dome 414, upper shell 416, and lower shell 417 may be made of a suitable material, such as a polymer, such as a polyolefin, such as a polypropylene copolymer, and may be a suitable color, such as black or dark blue to prevent bacteria growth. In an embodiment, the upper dome 412, lower dome 414, upper shell 416, and lower shell 417 may be injection-molded components. The upper dome 412 and the lower dome 414 may be coupled to the upper shell 416 and lower shell 417 respectively in a similar manner as discussed above.

Retainer rings 476 and 478 are provided that are connected to a respective one of the upper and lower shells 416 and 417 at respective ends 418 and 420 in a suitable manner, such as by a spin weld. The diaphragm 424 is then positioned and the shells 416 and 417 brought together such that the retainer rings 476 and 478 abut one another and trap a bead 438 of the diaphragm 424 between one another. The retainer rings 476 and 478 are then coupled together in a suitable manner, such as by a hot plate weld to sandwich the bead 438 between one another to form a hermetical seal. Once coupled, the outer surfaces of the upper and lower shells 416 and 417 will be flush with one another eliminating uneven surfaces for fiberwinding and reducing stress on the outside surfaces.

Figure 30:
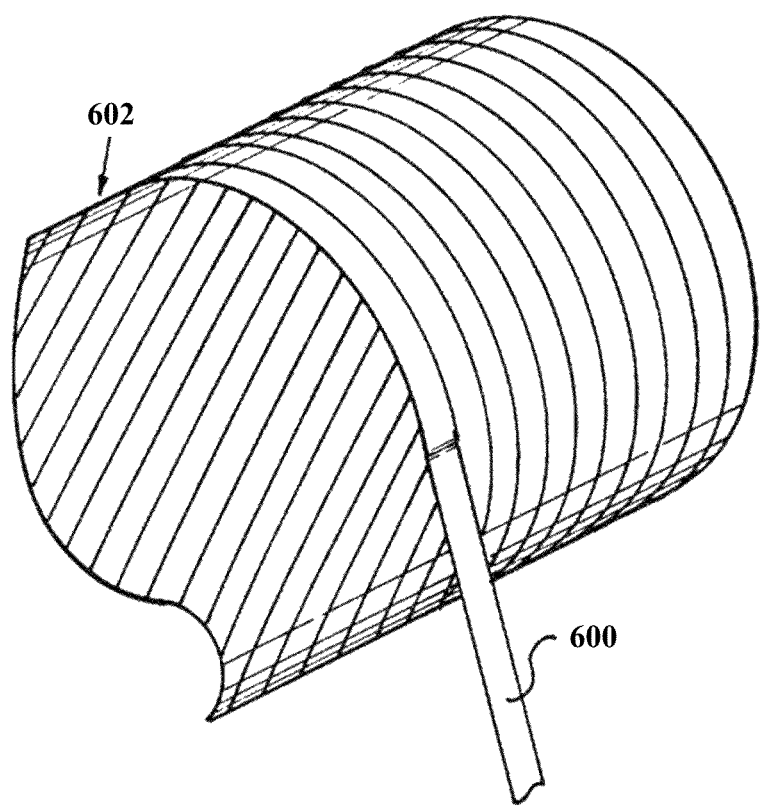
FIG. 30 is a perspective view of an exemplary tank with fiberwinding.

Turning now to FIG. 30, an exemplary fiberwinding around the tanks 10, 310, 410, and 510 is shown. The fiberwinding can include multiple layers of fiberwinding 600 that can be helically and circumferentially wrapped. In an embodiment, the fiberwinding can be wrapped over a preliminary fiberwinding layer. An outer fiberwinding layer 602 can be formed of the multiple layers of the fiberwinding 600.

The aforementioned systems, components, (e.g., tanks, stands, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

While the embodiments discussed herein have been related to the apparatus, systems and methods discussed above, these embodiments are intended to be exemplary and are not intended to limit the applicability of these embodiments to only those discussions set forth herein.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the invention has been described for purposes of illustrating the best mode known to the applicant at the time and enable one of ordinary skill in the art to practice the invention, including making and using devices or systems and performing incorporated methods. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A tank comprising:
   a polymeric upper dome having a neck with an inner surface defining a through passage;
   a polymeric lower dome having a neck with an inner surface defining a through passage;
   a polymeric shell having a first end connected to the upper dome and a second end connected to the lower dome;
   a polymeric connection connected to each of the upper and lower domes in the through passages of the necks, the connections being the same as one another and each connection having a body and a flange portion extending from the body, the body having an outer surface that abuts the inner surface of the respective neck and an inner surface defining a through passage with threads for connection of attachments, and the flange portion being received in a corresponding area in the respective upper and lower dome, each corresponding area being an annular pocket having an upper and lower surface; and
   a fiberwinding layer around an outer surface of the polymeric upper dome, polymeric lower dome, and polymeric shell,
   wherein the upper dome, lower dome, and shell form a cavity, and
   wherein the through passage of the upper dome is in communication with the cavity and the through passage of the lower dome is in communication with the cavity.

2. The tank according to claim 1, wherein each connection is attached to the respective upper and lower dome by insert molding such that at least a bottom and top of each flange portion is surrounded by the corresponding area in the respective upper and lower dome.

3. The tank according to claim 1, further comprising an air connector having threads on an outer surface thereof that are connected to the threads on the inner surface of the connection attached to the upper dome, and an air stem for pressurizing the tank.

4. The tank according to claim 1, further comprising a connector having an inlet portion with threads on an outer surface thereof that are connected to the threads on the inner surface of the connection attached to the lower dome, and a conduit portion extending from the inlet portion, the inlet portion and conduit portion each having a through passage fluidly connected with one another to direct flow from the cavity to the conduit portion.

5. The tank according to claim 4, wherein the connector further comprises at least one flange extending from the inlet portion, the at least one flange configured to connect to a support stand to hold the tank relative to the support stand.

6. The tank according to claim 4, wherein the conduit portion includes a support rib on an underside thereof for contacting a support stand when weight is applied to the connector to impede downward movement of the conduit portion.

7. The tank according to claim 1, wherein each neck includes a radially inwardly extending annular rib extending from the inner surface serving as a seat for a seal.

8. The tank according to claim 7, wherein an end of each connection abuts the respective radially inwardly extending annular rib.

9. The tank according to claim 1, further including a flexible diaphragm disposed in the cavity and connected to an inner wall of the polymeric shell.

10. An assembly for a tank comprising:
    a polymeric upper dome having, a first end, a second end, a neck at the second end having an inner surface defining a through passage, and a lead-in proximate the first end of the upper dome and having an annular base;
    a polymeric lower dome having a first end, a second end, a neck at the second end having an inner surface defining a through passage, and a lead-in proximate the first end of the lower dome and having an annular base;
    a polymeric shell having a first end and a second end and being configured to be connected to the polymeric upper and lower domes to form a cavity, wherein an end face of the first end of the shell is configured to abut the annular base of the lead-in of the polymeric upper dome and an end face of the second end of the shell is configured to abut the annular base of the lead-in of the polymeric lower dome; and
    a flexible diaphragm configured to be connected to an inner wall of the polymeric shell in the cavity,
    wherein each neck includes a radially outwardly extending annular rib along its outer surface, each radially outwardly extending annular rib including a plurality of circumferentially spaced flats.

11. The assembly according to claim 10, further comprising a connection attached to each of the upper and lower domes in the through passages of the necks, the connections being the same as one another and each including a through passage with threads along an inner surface thereof for connection of attachments and a flange portion received in a corresponding area in the respective upper and lower dome.

12. The assembly according to claim 11, wherein each connection includes one or more annular ribs on an outer surface thereof that abut the inner surface of the respective neck.

13. The assembly according to claim 10, further comprising an inner hoop ring configured to be connected to an inner surface of the flexible diaphragm.

* * * * *